United States Patent [19]
Becker et al.

[11] Patent Number: 6,167,453
[45] Date of Patent: Dec. 26, 2000

[54] METHOD AND APPARATUS FOR UTILIZING URLS TO SPECIFY LOCAL OR REMOTE JAVA BEAN REPOSITORIES

[75] Inventors: Craig Henry Becker; James Irwin Knutson, both of Austin, Tex.

[73] Assignee: International Business Machines Corporation, Armonk, N.Y.

[21] Appl. No.: 08/975,342

[22] Filed: Nov. 20, 1997

[51] Int. Cl.[7] .................................................. G06F 13/00
[52] U.S. Cl. ........................ 709/245; 709/200; 709/218
[58] Field of Search ..................................... 709/224, 217, 709/225, 218, 250, 245, 228, 200

[56] References Cited

U.S. PATENT DOCUMENTS

| | | |
|---|---|---|
| 5,530,852 | 6/1996 | Meske, Jr. et al. . |
| 5,581,755 | 12/1996 | Koerber et al. . |
| 5,649,186 | 7/1997 | Ferguson . |
| 5,678,041 | 10/1997 | Baker et al. . |
| 5,781,909 | 7/1998 | Logan et al. ............................. 709/200 |
| 5,802,299 | 9/1998 | Logan et al. ............................. 709/218 |
| 5,890,171 | 3/1999 | Blumer et al. ........................... 707/501 |
| 5,892,908 | 4/1999 | Hughes et al. ........................... 709/250 |

OTHER PUBLICATIONS

Brown et al., "Using Netscape 2", 2nd Edition, 1995.

*Primary Examiner*—Zarni Maung
*Assistant Examiner*—Philip B. Tran
*Attorney, Agent, or Firm*—David A. Mims, Jr.

[57] ABSTRACT

A method and apparatus for extending the capability of uniform Resource Locators (URLs) to access Repositories on local and Internet connected remote machines. A general syntax for a uniform resource locator for a local machine has a protocol of "beans:", followed by an optional entry for a drive letter. The drive letter allows specification of a local device (e.g., A: or C: drive) where a repository is located. In addition, the general syntax contains entries for a file system path, repository name and Java Archive designation. The general syntax for the uniform resource locator for a remote machine has a protocol of "beans:" followed by entries for host name, file system path, repository name, and the Java Archive designation.

15 Claims, 5 Drawing Sheets

METHOD AND APPARATUS FOR UTILIZING URLS TO SPECIFY LOCAL OR REMOTE JAVA BEAN REPOSITORIES

FIELD OF THE INVENTION

The present invention relates to data processing systems, and more particularly, to accessing information on a remote computer network or on a local computer.

BACKGROUND OF THE INVENTION

The Internet allows users to search the massive quantities of information stored in computers located all over the world, retrieve data and place it on their own computers. The Internet has been around, in various forms, since 1969. However, until the World Wide Web (WWW) was launched in 1993, computer users had to utilize cumbersome methods with cryptic commands to transfer or receive information. The Web, on the other hand, is a user-friendly graphical interface that lets users simply point and click a mouse to effortlessly navigate the Internet.

A standard naming convention has evolved on the Web known as a Uniform Resource Locator (URL). The URL is a physical address of an object which is retrievable using network protocols such as Hypertext Transfer Protocol (HTTP) and File Transfer Protocol (FTP). URLs are mostly used to identify resources on the Internet such as documents. In most cases, the URL syntax is straight forward, containing a document path, either absolute or relative, to a certain starting pointer. A typical URL has the following form: "http://the-tech.mit.edu/weather/ . . . " The first part of the URL, before the colon, specifies the access protocol over the Internet. In this case, http means "HyperText Transfer protocol," the protocol used by web servers. The second part of the URL names the location (computer) to access. Generally the first words between the slashes indicate the name of the computer where the information is housed; and the remaining words identify directories and file names. A number of techniques have been employed to extend the capability of a URL. One prior art technique discloses a method of encoding information in a File Transfer Protocol (FTP) Uniform Resource Locator (URL), which is sent to a World Wide Web (WWW) browser in order to access data on a machine remotely connected to an FTP Server. Access to the WWW via a web browser has become ubiquitous, both at home and in the corporate environment. One feature of the web browser is the ability to get and put files on an FTP Server. The web browser supports the ability to pass a Userid and password to the FTP Server and implements the function of an FTP client to access these files and traverse directories. A normal connection to an FTP server from a web browser uses an FTP URL and is of the form: //userid:password@hostname. In order to trick the Web browser into instructing the FTP Server that an APPC File Transfer Protocol (AFTP) connection is needed, and provide it with destination, Userid, and password, a technique is used to differentiate it from a normal FTP connection. The technique combines a System Network Architecture (SNA) destination and Userid into the FTP Userid field and prefix each with a plus "+" sign. For example: ftp://+aftpserv+ Userid+password@hostname. The Userid and password strings were passed directly to the FTP Server which was able to recognize the plus sign "+" and interpret the data as the SNA destination "aftpserv", Userid and password.

Another prior art solution extends the capability of URLs by allowing the mapping of a protocol request to Uniform Resource Locators. When a URL is used to identify documents, the URL syntax is straight forward because it contains the document path to a certain starting point. URLs to identify protocol requests, however, have a rather complex mapping. One method uniquely maps a protocol request to a URL and vice versa. Such a mapping is compliant with the standard URL syntax and can thus be handled by conventional HTTP servers and Web browsers. The URL is composed of five elements: http://<host>/ <protocol>/<operation>/<context>?<parameters>, wherein <host> identifies the host where the HTTP server runs, <protocol> specifies the protocol operation, <operation> specifies the protocol operation, <context> specifies the context to use, if any and <parameters> contains the operation parameters. While each of the previously described methods have extended the functions of URLs, none provides the ability to specify local or remote computers containing a Java Beans repository.

Java Beans is an architecture and platform-neutral Application Programming Interface (API) for creating and using dynamic Java components. Java Beans and their common properties and functions are described in detail in the text, "Java in a Nutshell", 2nd. Edition, David Flanagan, O'Reilly and Assoc. Inc., 1997. Java Beans enhance the Java platform by allowing richer, more dynamic interaction. Java Beans allow developers to define independent components that can be used and re-used in a variety of combinations to compose new applications inside a variety of browser and non-browser environments. Java Beans components can be GUI widgets, non-visual functions and services, applets and more full-scale applications. Each of these components can be built by different developers at separate times.

Java employs a platform independent file format that concatenates and compresses a set of Java classes, image, audio and data files into one file called a JAR (Java Archive) file. One of the main attributes of the JAR file design is to reduce the number of HTTP (HyperText Transfer Protocol) connections that need to be opened, thus reducing download times. The file format is the popular ZIP format and can be used as a general archiving tool. Java Beans can be moved around in "bulk" using the JAR file. Current implementations of URLs are unable to specify local and remote Java Beans repositories and repository sub-elements.

The Java Development Kit (JDK), manufactured by Sun Microsystems, Inc., provides a Java.net package which contains a class called URL that permits programs to represent a URL address. Programs can interact with the Internet to find resources. Java's Java.net Class URL removes the requirement for programs to provide string parsing of URLs by returning host name, file name, and other information. While the Java.net Class eases access to the Internet, a general URL format has not evolved for specifying Java Bean repositories and repository sub-elements.

Consequently, it would be desirable to provide a method and apparatus for extending uniform resource locators so that they are capable of specifying local and remote Java Bean repositories and repository sub-elements.

SUMMARY OF THE INVENTION

This invention relates to a method and apparatus for extending the capability of Uniform Resource Locators (URLs) to access Repositories on local and Internet connected remote machines. A general syntax is disclosed for a uniform resource locator for a local machine that has a protocol of "beans:" followed by an optional entry for a drive letter. The drive letter allows specification of a local device (e.g., A: or C: drive) where a repository is located. In addition, the general syntax contains entries for a file system path, repository name and Java Archive designation. The general syntax for the uniform resource locator for a remote machine has a protocol of "beans:" followed by entries for host name, file system path, repository name, and the Java Archive designation. The specification of sub-elements residing inside a Java Bean repository are capable of being easily accessed. The sub-elements are appended to the uniform resource locator separated by unique delimiters and allows a client computer to access sub-elements within the JAR file.

DETAILED DESCRIPTION OF THE EMBODIMENTS

This invention provides a method and apparatus for a uniform, consistent, flexible scheme for specifying Java Beans repositories using a uniform resource locator (URL). As used in this invention, a repository is a persistent collection of Java Bean elements (classes, images, audio, data, etc.). This invention allows the selection of Repositories on a local or Internet-connected remote machines using a URL. In addition, the invention allows the specification of local or remote JAR (Java Archive) files or directory repositories.

Figure 1:
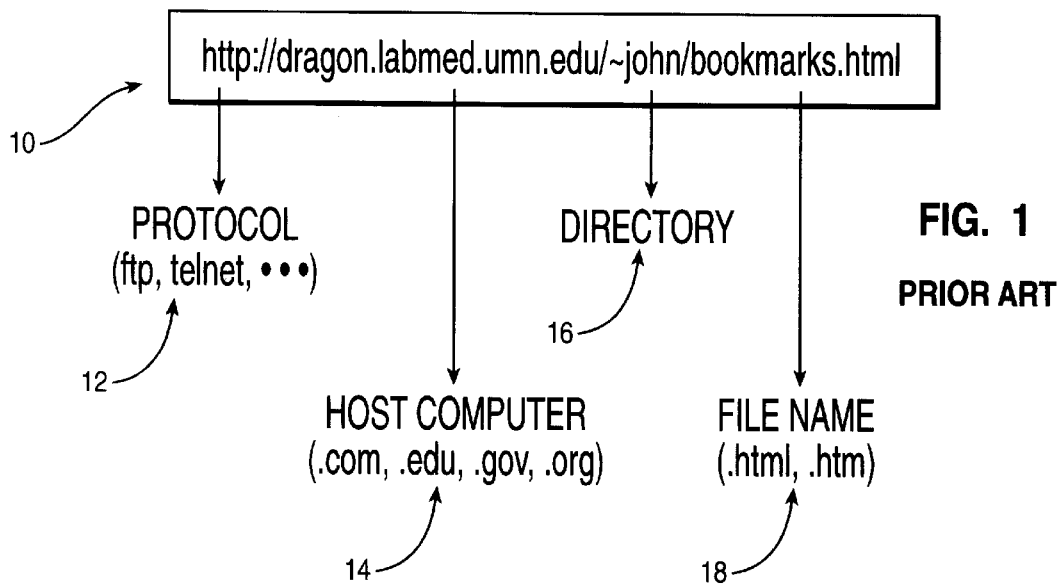
FIG. 1 illustrates the format for a prior art Uniform Resource Locator (URL)
Figure 2:
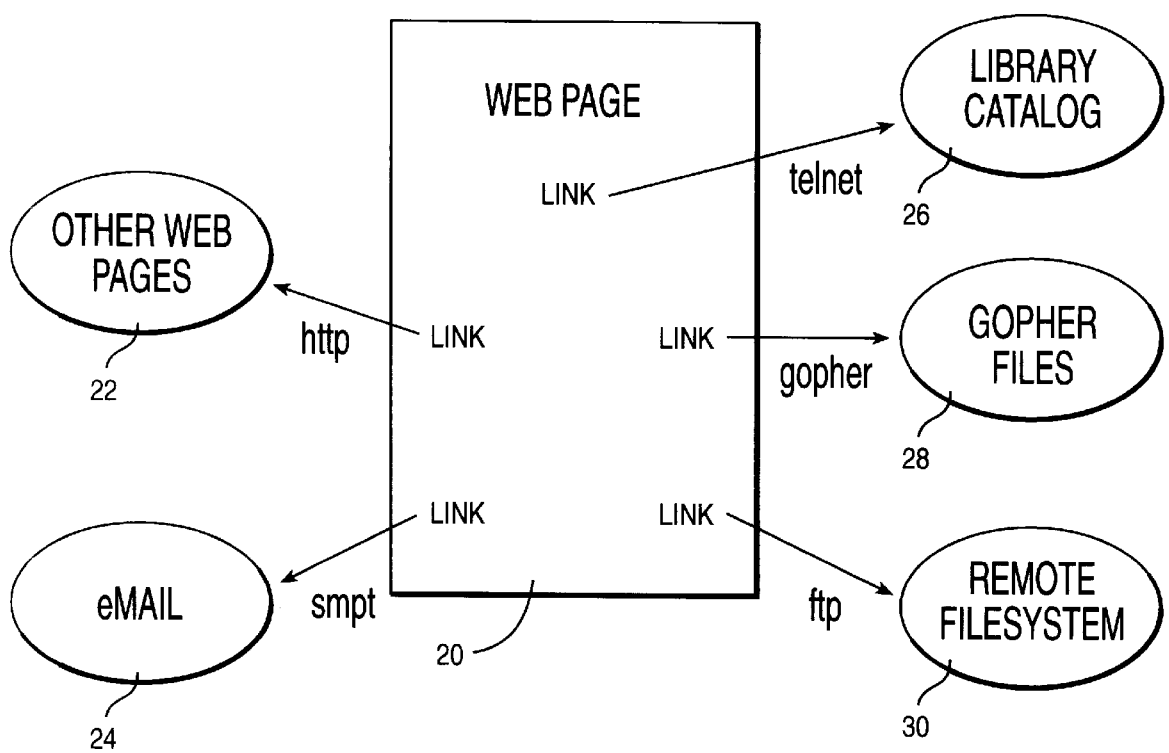
FIG. 2 is a block diagram of a World Wide Web (WWW) page showing the protocol links available using a URL.

Referring now to FIG. 1, there is shown an example of a prior art URL 10. The format of the URL allows the specification of a protocol 12, a host computer 14, a directory 16 and a file name 18. The format of the URL allows a computer connected to the World Wide Web to have easy access to resources located on other computers. Referring now to FIG. 2, there is shown a Web page 20 with links to other resources located on the World Wide Web. Links to Other Web Pages 22 are possible using the HyperText Transfer Protocol (HTTP:) protocol. Changing the protocol to the telnet protocol allows access to Library Catalog 26. Likewise, a remote Files System 30 may be accessed through a FTP protocol, or Gopher Files 28 through a gopher protocol. A user may even access electronic mail 24 (eMail) using a Simple Mail Transfer Protocol (SMTP) protocol.

The format for the Uniform Resource Locator (URL) may be generalized in the following format:

--- protocol://host.domain[:port]/path/filename

....where protocol can be one of:
http://a file on a World-Wide Web server
file:// a file on your local system (e.g., hard drive)
ftp:// a file on an anonymous FTP server
gopher:// a file on a Gopher server
telnet:// used to connect to a remote computer and run a program on it
....where host.domain is the site's Internet address:
www.iat.unc.edu (an educational site)
www.glaxo.com (a commercial site)
library.nichs.nih.gov (a government site)
www.inect.co.uk (a commercial site in the UK)
....where port is a number that identifies a service within a computer (port numbers are seldom required):
Port 25 is used by the computer's email system
Port 23 is used for Telnet service
Port 70 is used for Gopher service
....where path indicates where in the directory tree the document is located:
/www/homepages/faculty/smith
/class-schedule/fall-semester/
/marketing/customers/
....where filename is the name for the document on the computer system:
homepage.html
homepage.htm
my-web-pages.html
document.txt
picture.gif

---

Figure 3:
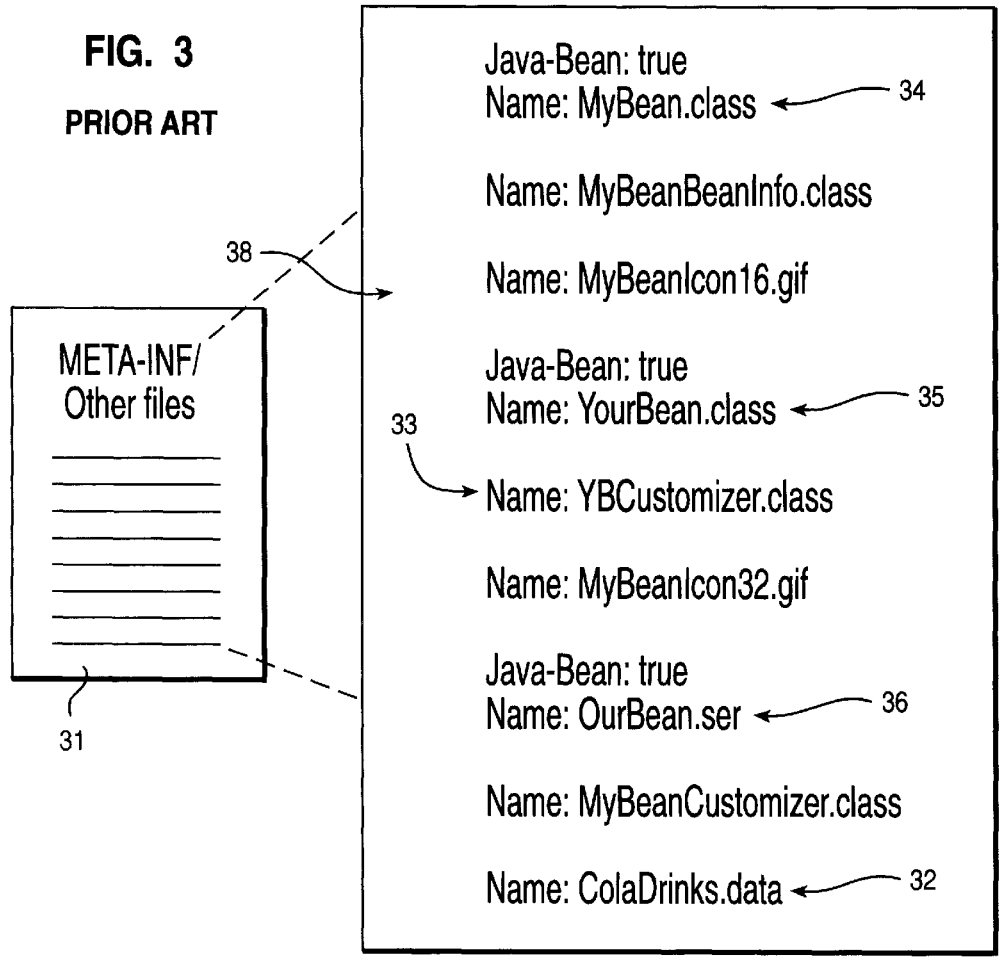
FIG. 3 illustrates Java Beans stored in a Java Beans Archive (JAR) file.

Referring now to FIG. 3, there is shown a sample plain Manifest file 31 for a prior art Java Archive (JAR) file. The Manifest file 38 contains three Java Beans which have been designated MyBean 34, YourBean 35 and OurBean 36. The OurBean 36 Java Bean utilizes ColaDrinks.data 32 and the YourBean 35 Java Bean has as a sub-element YBCustomizer.class 33. In general, sub-elements containing the name of a Java Bean or located under a Java Bean are utilized by that particular Bean.

Figure 4:
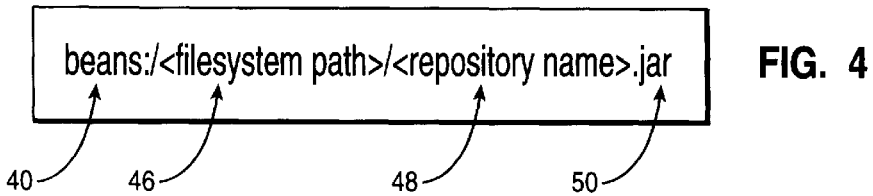
FIG. 4 is a format for a URL providing for the specification of Java Beans stored in a local JAR file using this invention.

Referring now to FIG. 4, there is shown a format for a Uniform Resource Locator (URL) for specifying a local Java Archive (JAR) repository on a UNIX or Andrew File System. The format uses a protocol of beans: 40 without a hostname to indicate that the URL is specifying a local repository. A local repository, as used in this invention, refers to a persistent collection of Java Bean elements (classes, images, audio, data, etc.) on a device accessed directly without use of a telecommunication line, such as a hard file, floppy disk, etc. Referring again to FIG. 4, the protocol beans: 40 is followed by a <File System Path> 46, a <Repository Name> 48 and a ".jar" 50 designation to indicate a JAR file containing Java Beans. Using the above format, a user may easily indicate whether a JAR file is found in a local machine or on an Internet-connected remote machine. A JAR file stored on UNIX or an Andrew File System (afs), under the file system path "/austin/projects/objects/beans" and in a repository named "baked" is specified using the format:

beans:/afs/austin/projects/objects/beans/baked.jar

Figure 5:
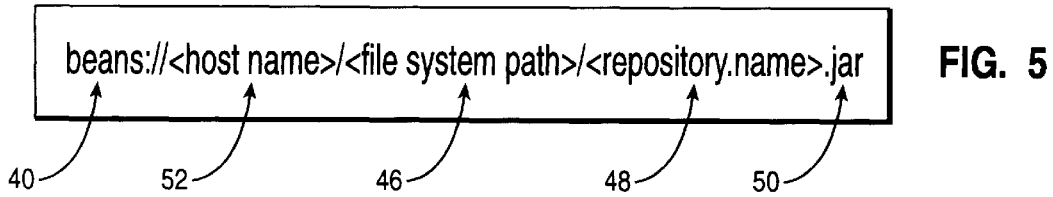
FIG. 5 is a format for a URL providing for the specification of Java Beans stored in a remote JAR file using this invention.

Referring to FIG. 5, there is shown a URL format for a remote JAR archive repository located on an Internet-connected remote machine. The URL format has a protocol of beans: 40 followed by a <host name> 52, <file system path> 46, followed by a <repository name> 48. The URL ends with a Java Archive designation .jar 50. Using the disclosed format, a JAR repository located on the remote server "beansrus.ibm.com" that is named "utilities.jar" with the pathname "/java/jars" is expressed as follows:

beans://beansrus.ibm.com/java/jars/utilities.jar

Figure 6:
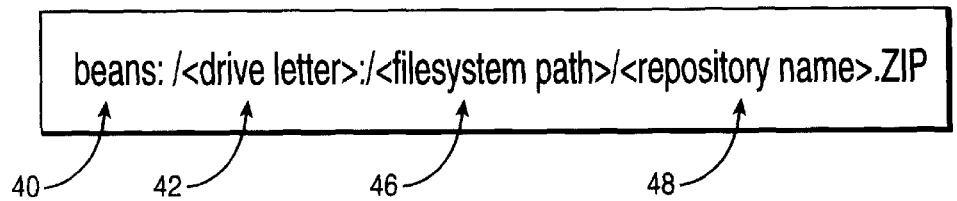
FIG. 6 is a format for a URL providing for the specification of a local ZIP repository for a Java Bean using the present invention.

Referring now to FIG. 6, there is shown a URL format for specifying a local ZIP repository containing Java Beans. A protocol beans: 40 is followed by an entry for the drive letter 42. The drive letter 42 allows the entry of information for the device where a directory is located on the local machine. A <file system path> 46 specifies the path on the local device. The URL ends with a <repository name> 48 for the directory. This command allows a ZIP file repository named "marquee.zip" on the local computer, located on drive "G:" under the file path "java/beans/repositories" to be specified using the following URL:

beans:/G:/java/beans/repositories/marquee.zip

A remote directory repository located on an Internet-connected remote machine is described using the following general URL format: beans://<server address>/<path name>. This format allows a directory having a server address of "beansrus.austin.ibm.com" at path name of "barcharts" to be expressed as follows:

beans://beansrus.austin.ibm.com/barcharts

Figure 7:
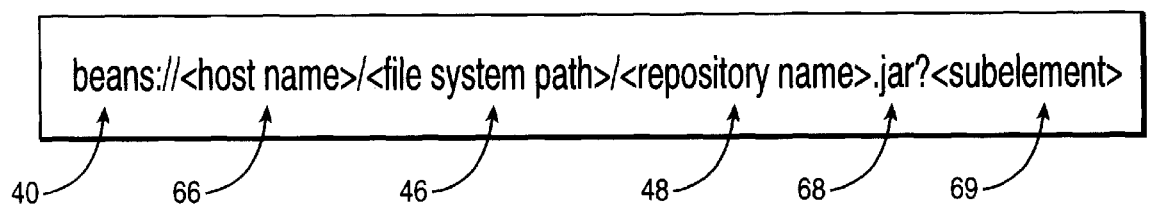
FIG. 7 is the syntax for a URL providing for the specification of sub-elements residing in a JAR file.

Referring to FIG. 7, there is shown the syntax for a URL allowing for the specification of sub-elements residing inside of a remote Java Bean repository. The URL has a protocol of beans: 40 followed by a host name 66, file system path 46, and repository name 48. A subelement 69 is indicated by appending it to the URL separated by a delimiter symbol such as a question mark 68. Using the disclosed URL, a subelement "menu_bean.class" stored at an Internet connected computer located at "COM/ibm/beans" within a "manybeans.jar" JAR archive repository on a server machine "beansserver.ibm.com" is specified using the following URL:

beans:/beansserver.ibm.com/beans/manybeans.jar?COM/ibm/beans/menu_bean.class

Note that multiple sub-elements may be specified by separating them with the question mark delimiters in the following manner:

beans://<hostname>/<filesystem path>/<repository name>.jar?<subelement1>?<subelement2>?. . . .

The above described URLs provide a flexible means of specifying Java Beans repositories and repository sub-elements. The URLs of this invention are valid URLs which are parsed and easily manipulated by any currently existing package such as the Java java.net URL class. This invention is easily extendable to handle future Java Beans repository formats. For example, a possible UUEncoded format (UNIX to UNIX Encoded) repository could be handled by simply defining the suffix ".uue" in place of ".jar". The syntax for such a format would be expressed as follows:

beans://beansrus.austin.ibm.com/utilities.uue

This invention allows for the simplification of the interface to the Java Beans repository access code because a programmer is presented with a single uniform interface for creating and accessing repositories, versus a grab-bag of different interfaces. This invention provides for future repository types because the actual programming interface does not have to change.

Figure 8:
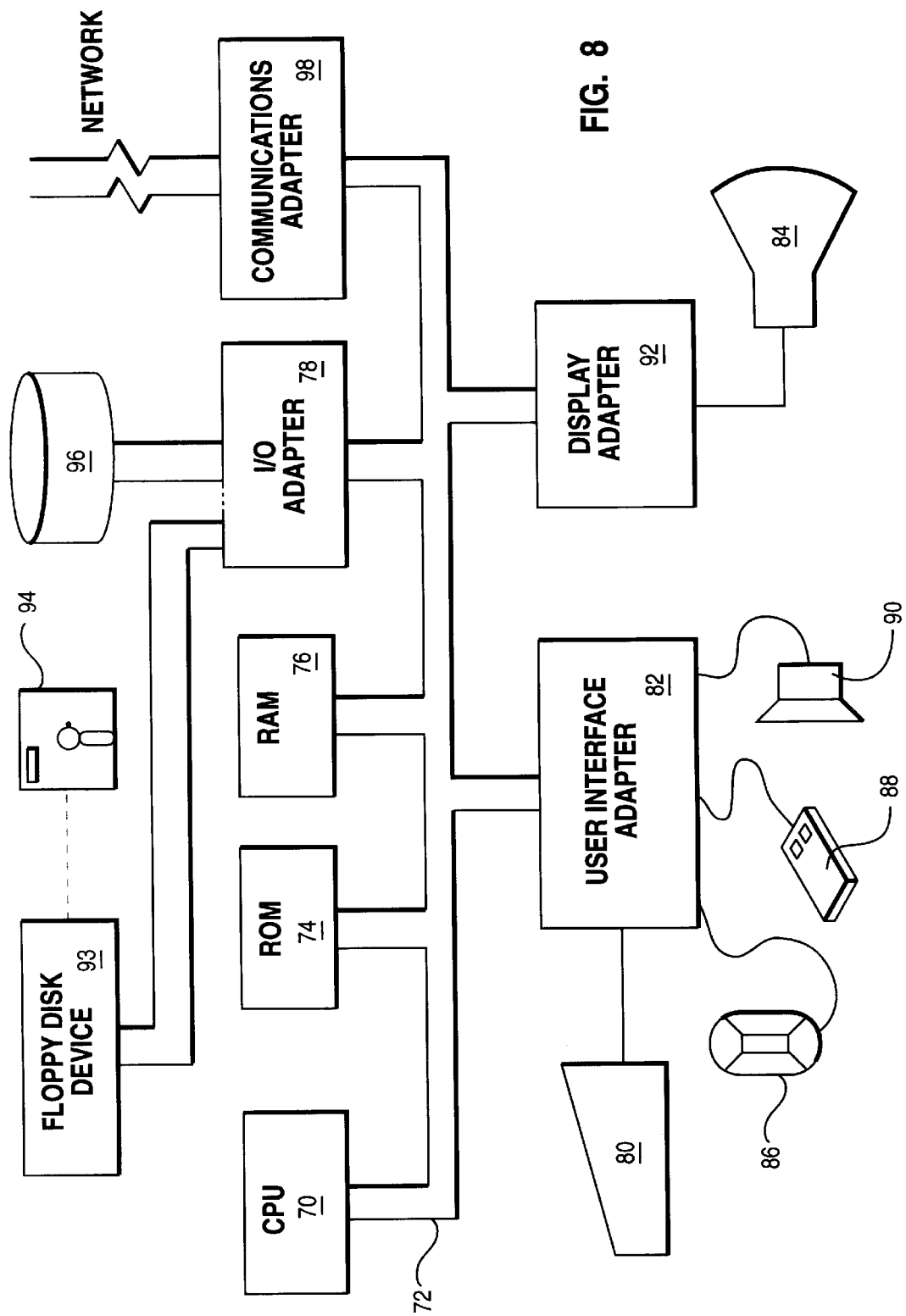
FIG. 8 illustrates a computer/workstation where this invention may be practiced.

Referring now to FIG. 8, there is shown a pictorial representation of a workstation, having a central processing unit 70, such as a conventional microprocessor, and a number of other units interconnected via a system bus 72. The workstation shown in FIG. 8, includes a Random Access Memory (RAM) 76, Read Only Memory (ROM) 74, an I/O adapter 78 for connecting peripheral devices such as floppy disk unit 93 to the bus, a user interface adapter 82 for connecting a keyboard 80, a mouse 88, a speaker 90, a microphone 86, and/or other user interface devices such as a touch screen device (not shown) to the bus, a communication adapter 98, for connecting the workstation to a data processing network and a display adapter 92, for connecting the bus to a display device 84. The workstation, in the preferred embodiment, has resident thereon the computer software making up this invention, which may be loaded from diskette 94.

Figure 9:
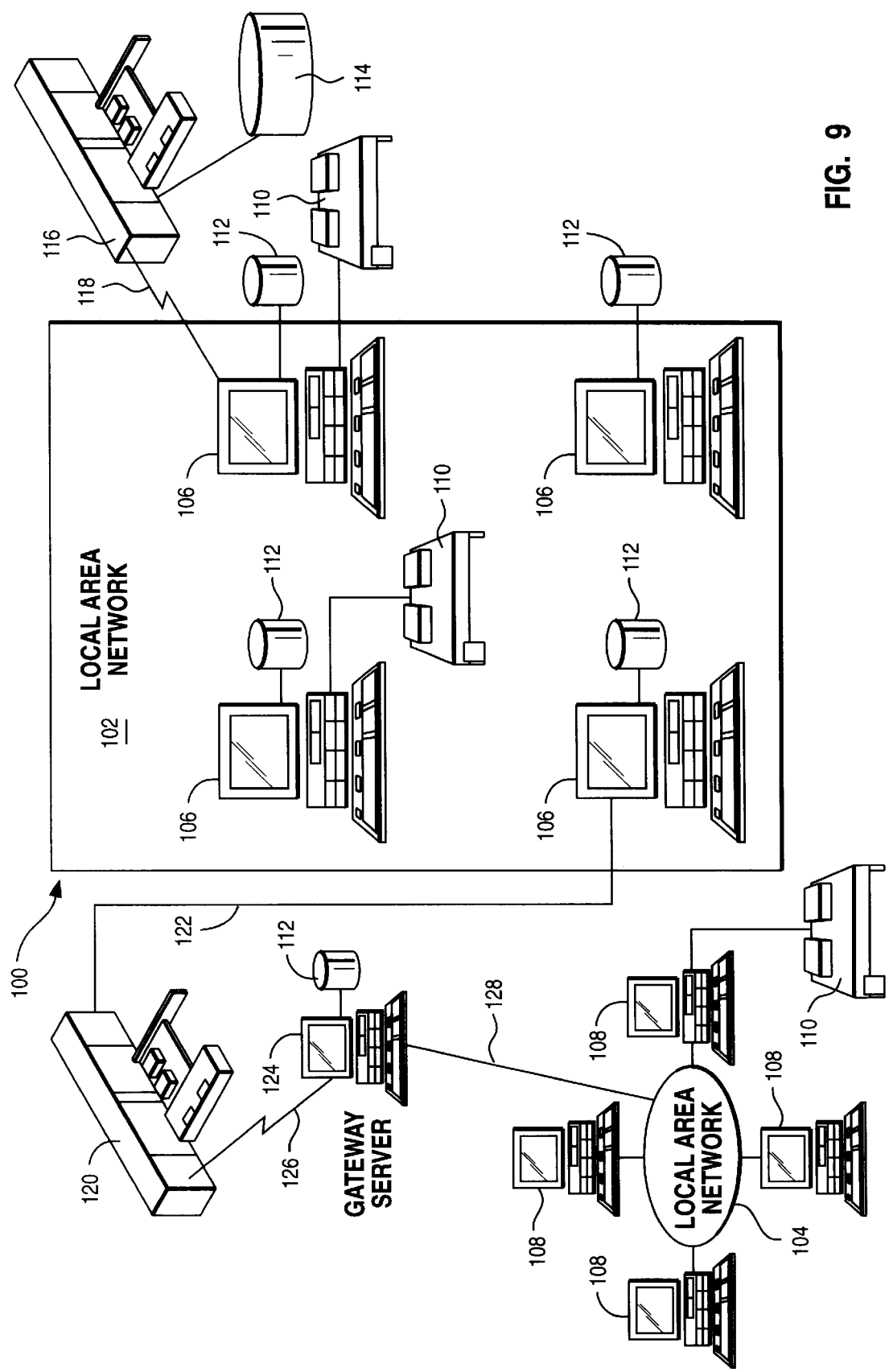
FIG. 9 is an illustrative embodiment of a computer network where the present invention may be practiced.

A representative network environment where this invention may be practiced is depicted in FIG. 9, which illustrates a pictorial representation of a distributed data processing system 100. As illustrated, data processing system 100 contains a plurality of networks, including local area networks (LAN) 102 and 104, each of which preferably includes a plurality of individual computers 106 and 108, respectively as shown in FIG. 8. One skilled in the art will appreciate that a plurality of workstations coupled to a host processor may be utilized for each such network. As is common in such data processing systems, each computer 106 and 108, may be coupled to a storage device 112, and a printer 110.

Data processing system 100 further includes one or more mainframe computers, such as mainframe computer 116, which may be preferably coupled to LAN 102 by means of a communication link 118. Mainframe computer 116 is preferably coupled to a storage device 114, which serves as remote storage for LAN 102. LAN 102 is also coupled via communications link 122 through communications controller 120 and communications link 126 to gateway server 124. Gateway server 124 is preferably a workstation which serves to link LAN 102 to LAN 104 via communications link 128. As understood by one skilled in the art, data processing system 100 additionally includes unillustrated gateways, routers, bridges, and various other network hardware utilized to interconnect the segments of data processing system 100.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for extending a uniform resource locator to specify a local Java Beans repository on said computer system and a remote Java Beans repository on a remote device connected to said computer system, comprising the steps of:

creating a uniform resource locator for use by a web browser having a protocol for a Java Bean on said computer system; and including a Java Archive indicator in said uniform resource locator having said protocol to allow specification of said local Java Beans repository on said computer system and said remote Java Beans repository.

2. The method of claim 1 wherein said step of creating a uniform resource locator further comprises:

appending a drive letter on said uniform resource locator having said protocol to indicate a local device on said computer for said local Java Beans repository.

3. The method of claim 1 wherein said step of creating a uniform resource locator further comprises:

appending a repository name on said uniform resource locator having said protocol for specifying a name for said local Java Beans repository and said remote Java Beans repository.

4. The method of claim 1 wherein said step of creating a uniform resource locator further comprises:

appending a file system path on said uniform resource locator having said protocol to specify a path name for said local Java Beans repository and said remote Java Beans repository.

5. The method of claim 1 wherein said step of creating a uniform resource locator further comprises:

appending a sub-element on said uniform resource locator having said protocol separated by a unique delimiter to allow specification of said sub-element in said remote Java Beans repository.

6. An apparatus for extending a uniform resource locator to specify a local Java Beans repository on said computer system and a remote Java Beans repository on a remote device connected to said computer system, comprising:

means for creating a uniform resource locator for use by a web browser having a protocol for a Java Bean on said computer system; and means for including a Java Archive indicator in said uniform resource locator having said protocol to allow specification of said local Java Beans repository on said computer system and said remote Java Beans repository.

7. The apparatus of claim 6 wherein said means for creating a uniform resource locator further comprises:

means for appending a drive letter on said uniform resource locator having said protocol to indicate a local device on said computer for said local Java Beans repository.

8. The apparatus of claim 6 wherein said means for creating a uniform resource locator further comprises:

means for appending a repository name on said uniform resource locator having said protocol for specifying a name for said local Java Beans repository and said remote Java Beans repository.

9. The apparatus of claim 6 wherein said means for creating a uniform resource locator further comprises:

means for appending a file system path on said uniform resource locator having said protocol to specify a path name for said local Java Beans repository and said remote Java Beans repository.

10. The apparatus of claim 6 wherein said means for creating a uniform resource locator further comprises:

means for appending a sub-element on said uniform resource locator having said protocol separated by a unique delimiter to allow specification of said sub-element in said remote Java Beans repository.

11. A computer program product having a computer readable medium having computer program logic recorded thereon for extending a uniform resource locator to specify a local Java Beans repository on said computer system and a remote Java Beans repository on a remote device connected to said computer system, comprising:

computer readable means for creating a uniform resource locator for use by a web browser having a protocol for a Java Bean on said computer system; and computer readable means for including a Java Archive indicator in said uniform resource locator having said protocol to allow specification of said local Java Beans repository on said computer system and said remote Java Beans repository.

12. A computer program product of claim 11 wherein said computer readable means for creating a uniform resource locator further comprises:

computer readable means for appending a drive letter on said uniform resource locator having said protocol to indicate a local device on said computer for said local Java Beans repository.

13. A computer program product of claim 11 wherein said computer readable means for creating a uniform resource locator further comprises:

computer readable means for appending a repository name on said uniform resource locator having said protocol for specifying a name for said local Java Beans repository and said remote Java Beans repository.

14. A computer program product of claim 11 wherein said computer readable means for creating a uniform resource locator further comprises:

computer readable means for appending a file system path on said uniform resource locator having said protocol to specify a path name for said local Java Beans repository and said remote Java Beans repository.

15. A computer program product of claim 11 wherein said computer readable means for creating a uniform resource locator further comprises:

computer readable means for appending a sub-element on said uniform resource locator having said protocol separated by a unique delimiter to allow specification of said sub-element in said remote Java Beans repository.

* * * * *